(12) United States Patent
Duksa (10) Patent No.: US 10,636,596 B2
(45) Date of Patent: Apr. 28, 2020

(54) FLOW SENSOR MODULE AND CONTROLLER

(71) Applicant: Thomas R. Duksa, Harwinton, CT (US)

(72) Inventor: Thomas R. Duksa, Harwinton, CT (US)

(*) Notice: Subject to any disclaimer, the term of this patent is extended or adjusted under 35 U.S.C. 154(b) by 203 days.

(21) Appl. No.: 15/871,346

(22) Filed: Jan. 15, 2018

(65) Prior Publication Data

US 2018/0261411 A1 Sep. 13, 2018

Related U.S. Application Data

(60) Provisional application No. 62/469,137, filed on Mar. 9, 2017.

(51) Int. Cl.
*H01H 35/40* (2006.01)
*G01F 1/20* (2006.01)
*G01F 1/36* (2006.01)

(52) U.S. Cl.
CPC ......... *H01H 35/405* (2013.01); *G01F 1/206* (2013.01); *G01F 1/363* (2013.01); *C02F 2307/10* (2013.01)

(58) Field of Classification Search
CPC ........ H01H 35/405; G01F 1/206; G01F 1/363
USPC .................................................. 200/81.9 R
See application file for complete search history.

(56) References Cited

U.S. PATENT DOCUMENTS

| | | | | |
|---|---|---|---|---|
| 3,341,099 A | * | 9/1967 | Jacobsen | B65H 23/0212 226/19 |
| 4,933,516 A | * | 6/1990 | Brown | H01H 35/26 200/81.9 R |
| 6,510,748 B2 | * | 1/2003 | Cooper | G01F 1/28 137/360 |
| 6,593,723 B1 | * | 7/2003 | Johnson | H01R 25/006 320/113 |
| 2008/0011076 A1 | * | 1/2008 | Buck | F16K 15/025 73/198 |
| 2014/0066880 A1 | * | 3/2014 | Prince | A61M 5/16881 604/500 |

* cited by examiner

*Primary Examiner* — Edwin A. Leon
*Assistant Examiner* — Iman Malakooti
(74) *Attorney, Agent, or Firm* — Alix, Yale & Ristas, LLP (57) ABSTRACT

A flow sensor module employs a fitting which defines an offset sensor bypass which is disposed at an acute angle to a linear flow path through the fitting. A dynamic pressure or flow sensor is disposed in the sensor bypass. A bonnet assembly is removably mounted to the fitting and mounts the sensor and fluidly seals the sensor in the fitting. A solid state controller has a panel which indicates a number of operational conditions including whether there is fluid flow through the flow system. The panel may have a chemical feed pump default indicator, a control valve indicator and an air trap device indicator and, in one embodiment, a manual override switch to turn on a feed pump, a control valve, an air trap device or an electrically operated device.

19 Claims, 8 Drawing Sheets

FLOW SENSOR MODULE AND CONTROLLER

BACKGROUND

This disclosure relates generally to flow sensors and flow switches for controlling fluid flow in a system. More particularly, this disclosure relates to a flow switch module having a dynamic pressure responsive member for controlling fluid pumps for the chemical treatment of potable water in a system.

This disclosure has application in conjunction with numerous fluid flow systems which employ a flow switch to generate an electrical signal to alert an operator or to automatically start the system to control the fluid flow through a conduct and in conjugation with devices to effectively control water treatment equipment to correctly alter the required water treatment chemicals.

One representative example to which the present disclosure relates is a flow switch of a type such as disclosed in U.S. Pat. No. 5,162,624. The latter flow switch employs a housing which can be molded from polyvinyl chloride, plastic material or other material and which defines a flow path between an inlet and an outlet of a housing. The fluid flow system may be employed for various fluids. The housing has an extension which receives a bonnet assembly for mounting a flow switch. The switch assembly carries a magnetic field responsive signal generator such as a reed switch. Electrical leads extend through the body portion of the bonnet assembly. A displaceable shuttle is exposed to the fluid flow. The shuttle is displaced by a calibrated flow rate so as to cause a signal generated state to change state and transmit a signal from the leads. A bypass path which diverts flow from the main flow path may be opened to control the fluid flow.

The integrity of any flow switch and the ability of a flow switch to reliably function to control flow over a significant lifetime can be compromised by integrating the flow switch into a flow passage—typically, a flow passage which has a linear unidirectional flow. An optimum regulatable flow is best realized with a long straight inlet conduit leading to an inlet for fluid exposure to the flow switch. An additional desirable feature for certain applications which require sanitation and extensive cleaning is that the flow conduits can be easily accessed for cleaning purposes.

SUMMARY

Briefly stated, the flow system comprises a first and a second aligned linear conduit portions which define a linear flow path. A fitting is interposed in the linear flow path between the first and second conduit portions and defines an intermediate portion of the linear flow path between the first and second conduit portions and also defines a sensor bypass disposed at an acute angle to the linear flow path. A dynamic pressure or flow sensor is disposed in the sensor bypass. A bonnet assembly is removably mounted to the fitting and mounts the sensor and fluidly seals the sensor in the fitting.

An inlet conduit has a valve for selectively introducing fluid into the flow path. The valve is responsive to a signal generated by the sensor. A first port is disposed in the first conduit portion and a second port is disposed in the second conduit portion. One or more gauges communicate with the ports. The sensor may be either a reed switch, a Hall switch, a bi-metallic switch or a change of logic switch. An annular opening is formed in the fitting bypass upstream from the sensor. A solid state controller comprises a panel which indicates whether there is fluid flow through the flow system. A manual override switch turns on a device which may be, for example, a feed pump, a control valve, an air trap device or an electrically operated device. The panel may also have a chemical feed pump halt indicator, a control indicator or an air trap device indicator. The bonnet assembly preferably comprises a central shaft and the fitting defines a blind hole wherein the shaft is received in the blind hole.

A flow sensor module for a linear flow path comprises longitudinally spaced cylindrical receivers configured to receive first and second conduit portions so as to define a linear flow path between and through the first and second conduit portion. The fitting comprises an offset extension which defines a sensor bypass disposed at an acute angle to the linear flow path. The fitting has an internal spherical style radius. A dynamic pressure or flow sensor is disposed in the sensor bypass. A bonnet assembly is mounted to the offset extension to mount the sensor and fluidly seal the sensor in the offset extension.

An inlet conduit has a valve for selectively introducing fluid into the flow path and is responsive to a signal generated by the sensor. A first port is defined in a first fitting portion and a second port is disposed in the second fitting portion. The sensor may be a reed switch, a Hall switch, a bi-metallic switch and a change of logic switch. An annular opening is located in the bypass upstream from the sensor. A solid state controller comprises a panel which indicates whether there is fluid flow through the linear flow path. An electrical receptacle for the controller is controlled by the sensor. The fitting defines a blind hole and the bonnet assembly has a shaft received in the blind hole. The bonnet assembly may be removably mounted to the fitting.

DETAILED DESCRIPTION

With reference to the drawings, wherein like numerals represent like parts throughout the figures, a flow sensor module is generally designated by the numeral 10. The module 10 comprises a PVC fitting 11 interposed between a pair of flow conduit pipe portions 12 and 14 which are generally aligned and typically have an extended linear flow path. The portions may be severed to install the enclosed module which typically has a pair of opposed inlet and outlet extensions 13 and 15 which closely receive the ends of the pipe portions 12 and 14, respectively. The installation may be accomplished by cutting an approximate 2⅞ inch section from an existing straight pipe to form conduit pipe portions 12 and 14 and gluing the module fitting 11 in place at the ends of the existing straight pipe. See FIG. 2.

Figure 1:
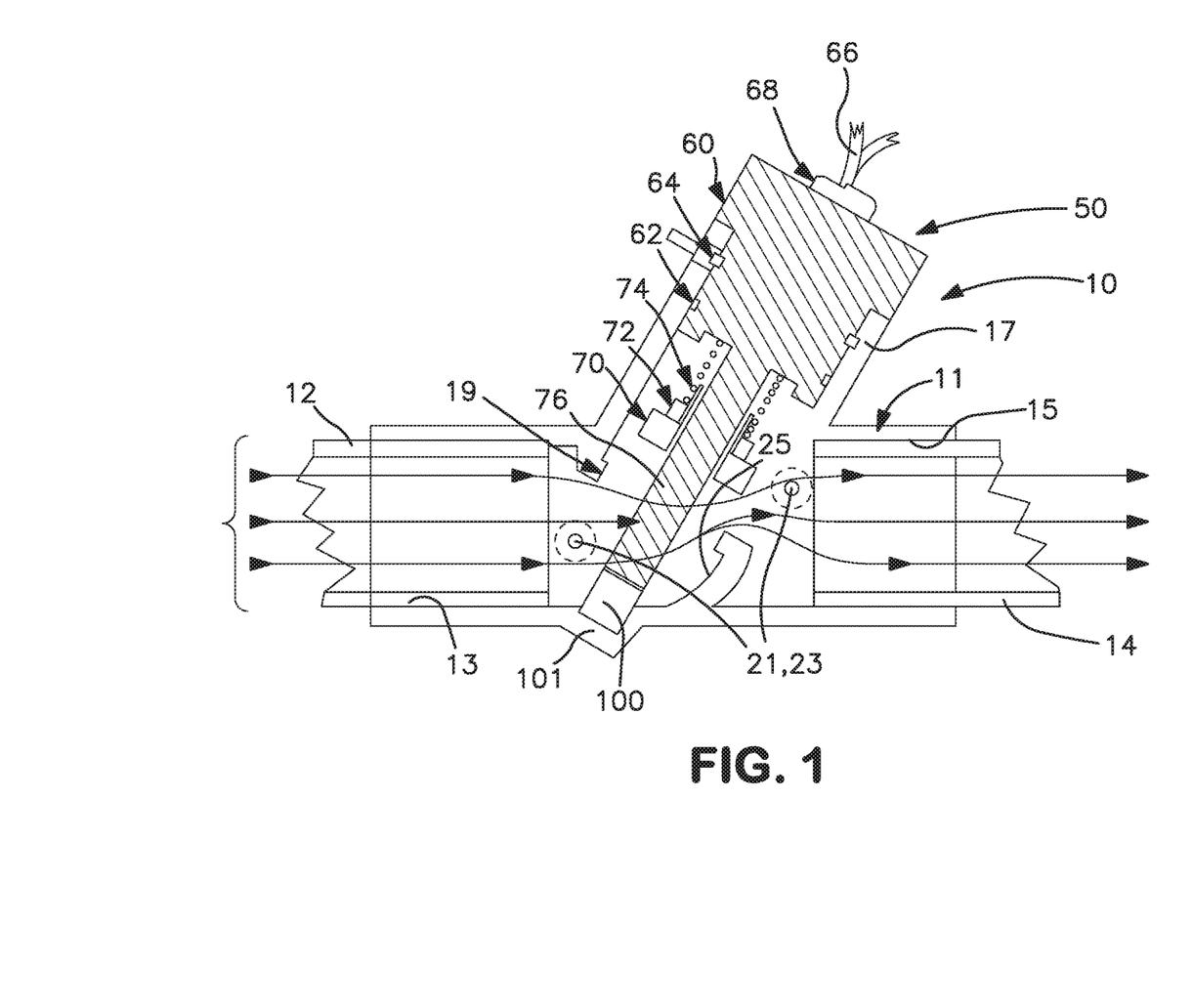
FIG. 1 is an annotated central sectional view of a portion of a flow system for a flowing liquid incorporating a flow sensor module in accordance with the present disclosure, portions being shown diagrammatically.

With additional reference to FIG. 1, the fitting 11 has an elbow-like construction with a bypass outlet portion 17 at an acute angle to the linear flow path through extensions 13 and 15. The bypass outlet portion 17 mounts a bonnet assembly 50. A molded boss on the fitting portion 17 is drilled and bored on axis to produce a blind hole 101 of a given diameter which is pre-machined in either a male or female structure, or a male-to-male structure to hold the end of the bonnet assembly 50 on the extension 100.

It will be appreciated that the axis of the bypass fitting 17 is disposed at an acute angle to the unidirectional flow in the pipe and thus does not add any significant turbulence or interrupt the pressure flow through the long straight conduit. An annular orifice 19 is formed in the fitting to provide a stable pressure exposure to the switch.

Figure 2:
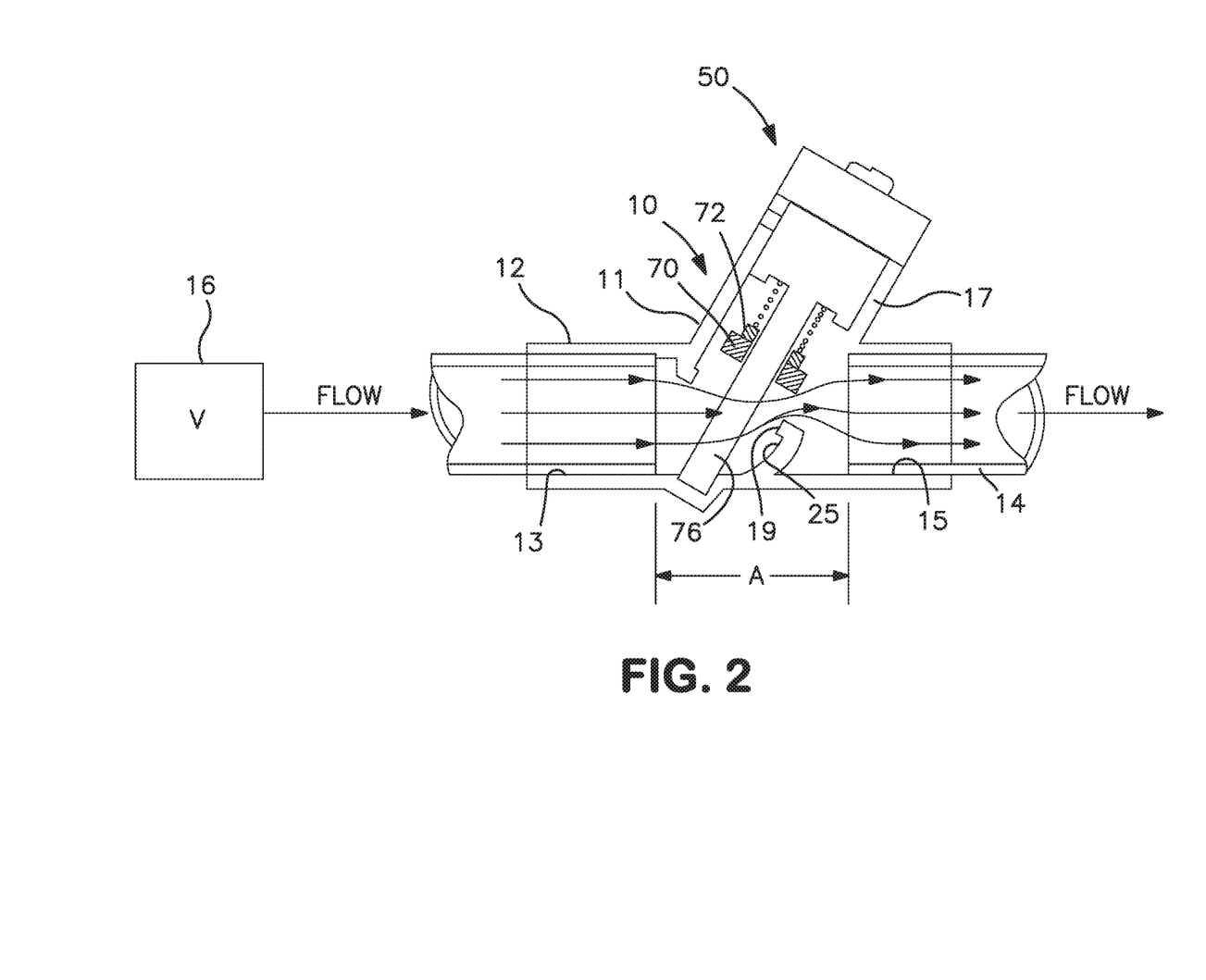
FIG. 2 is a schematic view illustrating the flow system incorporating the flow sensor module of FIG. 1, together with a control valve, portions being shown in additional detail and portions being shown diagrammatically.

A pair of differential pressure ports 21 and 23 (FIG. 1) are pre-formed in the fitting 11 at the inlet and the outlet side, respectively, of the fitting. These ports 21 and 23 may be easily accessed if required for a given operation so that exposure to various pressure sensors, temperature sensors, velocity gauges, etc., may be employed on the inlet and the outlet side of the sensor by a secondary pressure gauge being disposed across the port as required for a given application. It will be appreciated that the internal molded fitting has a spherical style radius 25 to facilitate a smooth liquid flow through the fitting. See FIGS. 1 and 2. A control valve 16 for controlling fluid flow is schematically shown in FIG. 2.

The bonnet assembly 50 comprises a switch housing 60 which may contain one of many sensors of varying types such as, for example, a reed switch, a Hall effect sensor, a bi-metal temperature gauge, a change of logic switch etc. The housing 60 is sealed by an O-ring 62, as illustrated in the drawings. A lock wire 64 is employed to secure the bonnet assembly 50 to the fitting 17. A shuttle 70 axially reciprocates along shaft 76 according to dynamic pressure and carries a magnet 72. The shuttle 70 is biased by a spring 74. The magnet/shuttle is biased to generate a flow indication signal which is transmitted from the sensor via wire 66. A switch wire strain relief 68 is disposed about the wire 66 at the top of the bonnet assembly.

It will be appreciated that the flow lines which employ the sensor module function to provide a substantially linear flow pattern due to the tilted annular orifice 19 and the components of the bonnet assembly 50 that are disposed off-axis. In addition, the two ports 21 and 23 are employed to provide a secondary indication of flow or lack of flow through the differential points via pressure sensors, temperature sensors, velocity gauges, etc. The inside diameters of the pipes 12 and 14 match the inside diameter of the annular orifice to provide a consistent matched flow. The structure allows for various numerous types of switches to be employed as required. Because of the substantially linear nature of the fluid flow path, supplement structures to enhance laminar flow structures are not required in order to provide a substantially turbulent free flow.

The pre-machined blind hole 101 allows for the boss 100 to hold the end shaft 76 of the bonnet assembly (or the shaft 76 may be longer to eliminate boss 100 and be inserted into blind hole 101) on the fitting true position, thus eliminating false signals from material creep, mechanical operating stresses, etc., that cause the signals to be distorted.

Figure 3:
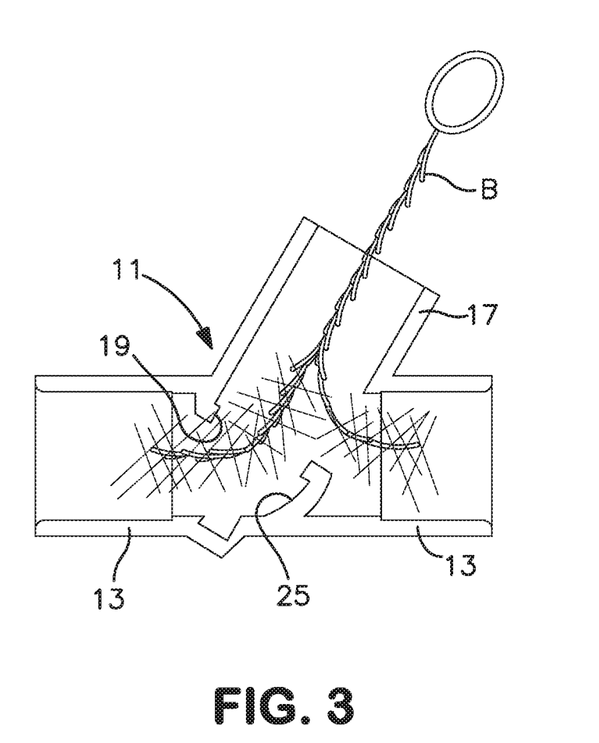
FIG. 3 is a simplified schematic view illustrating how the flow sensor module of FIG. 1 permits efficient cleaning of the flow sensor plumbing hardware and adjacent flow system structures.

With reference to FIG. 3, the clean-in-place tilted head design and orifice bore allows for easy cleaning in place. The operator may remove the lock wire 64 and remove the bonnet assembly 50, thus exposing all the internal surfaces to be decontaminated, for example, as is typically required for fluid flow system such as employed with beverages, milk, etc. FIG. 3 illustrates a representative brush B inserted into the module fitting 11 upon removing the bonnet assembly 50. Note the entire interior regions and surfaces of the module fitting and adjacent flow system structure may be accessed for cleaning.

Figure 4:
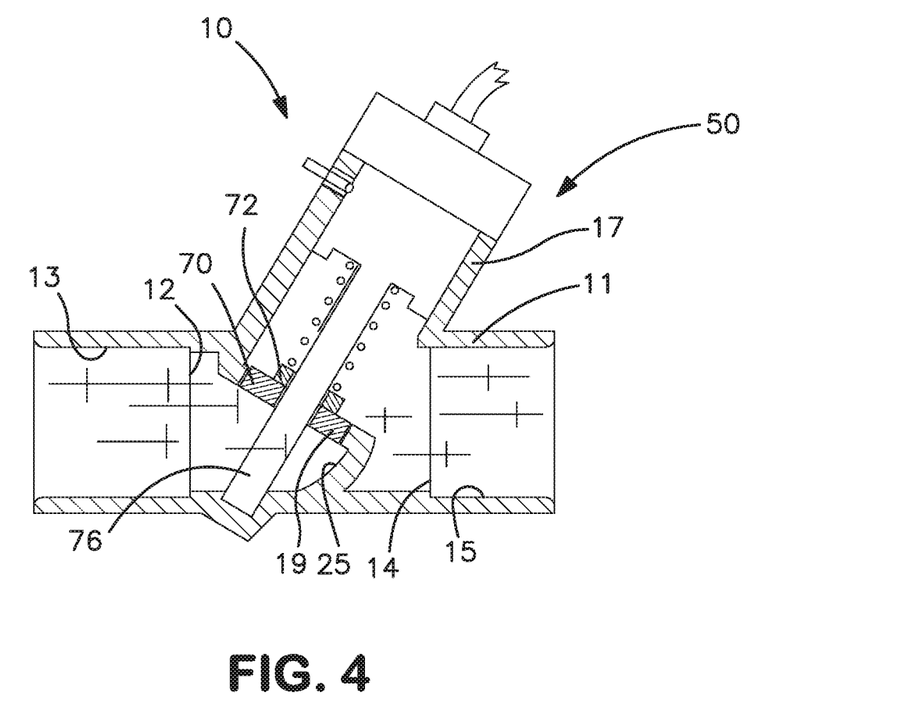
FIG. 4 is a simplified view, partly in schematic, illustrating the flow system and flow sensor module of FIG. 1 in a no-liquid flow condition.
Figure 5:
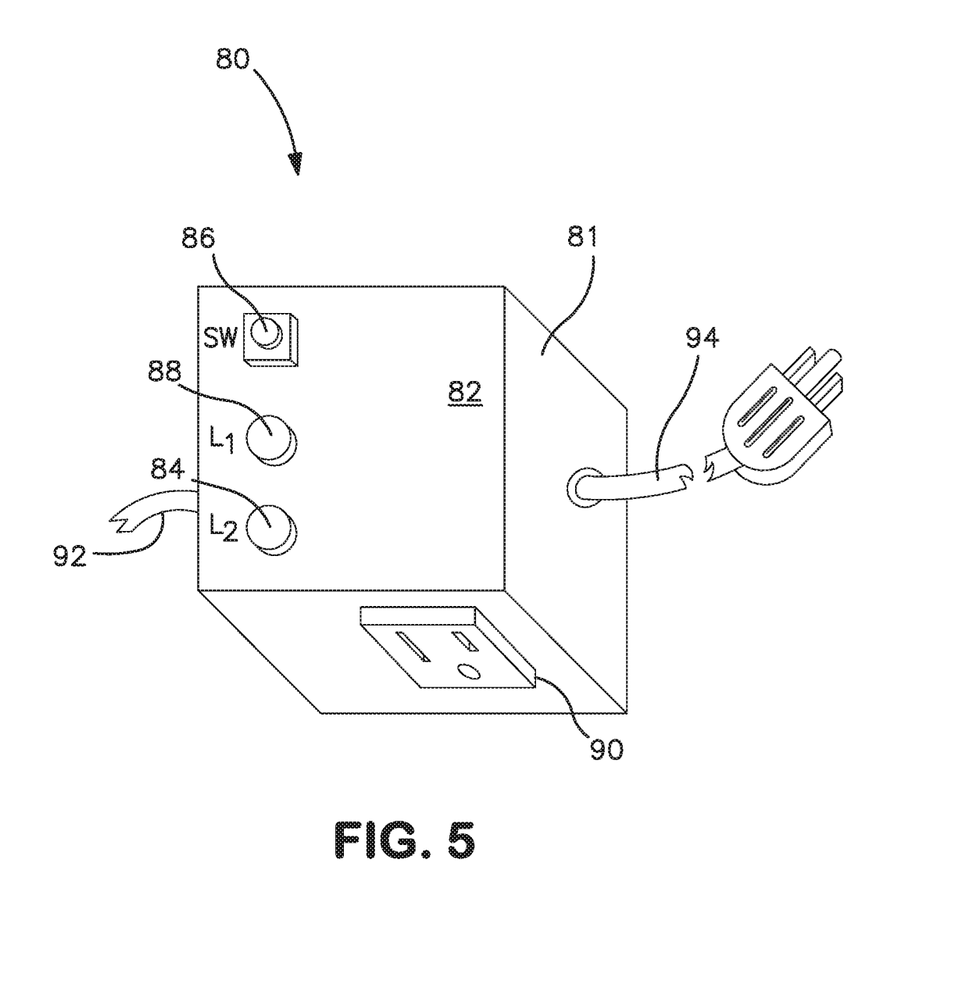
FIG. 5 is an annotated perspective view of a control panel for the flow sensor module of FIG. 1, portions broken away.

With reference to FIG. 5, a controller for the flow sensor module is generally designated by the numeral 80. The controller has a box-like housing 81 with all solid state components. A front panel 82 mounts an LED 84 which indicates the status of the liquid flow or the lack of the liquid flow. For the liquid flow system as illustrated in FIGS. 1 and 2, LED 84 would be illuminated. For the liquid flow system with no flow as illustrated in FIG. 4, LED 84 would be OFF. Other indicators (not illustrated) may also be provided.

A manual override push button switch 86 is employed to turn on the receptacle 90 to test the optional devices used or to turn on a chemical feed pump to purge out air, etc. The operator can tell if the chemical feed pump is in a default according to the status of the receptacle status light 88.

The controller 80 is an improvement over the conventional analogous systems wherein the chemical feed pump is wired to the water system pressure switch. The latter configured system is potentially dangerous because the pressure switch can turn on when water is required and simultaneously turn on the feed pump when there is no water or not enough water to dilute the chemicals being injected into the flow system.

Power cord 94 connects the controller 80 to a power source. The controller 80 also connects with the cord 92 to the flow sensor (which, in some installations, is wire 66). The electrical receptacle 90 is operated by the flow sensor, e.g., electrified or non-electrified.

It will be appreciated that during operation, the sensor interior components are positioned out of the prescribed laminar flow path, thus allowing a virtually unobstructed linear flow through the system.

Figure 6:
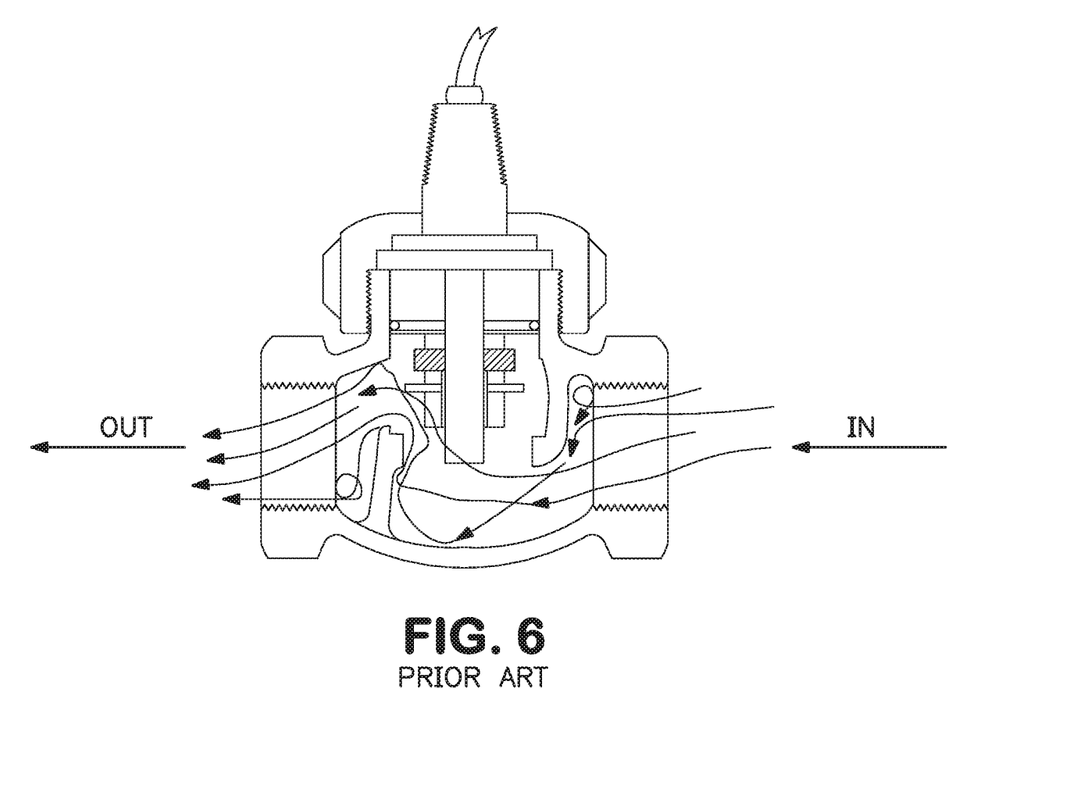
FIG. 6 is a side elevational sectional view, partly annotated and partly in schematic, illustrating liquid fluid flow currents with a prior art flow sensor module.
Figure 7:
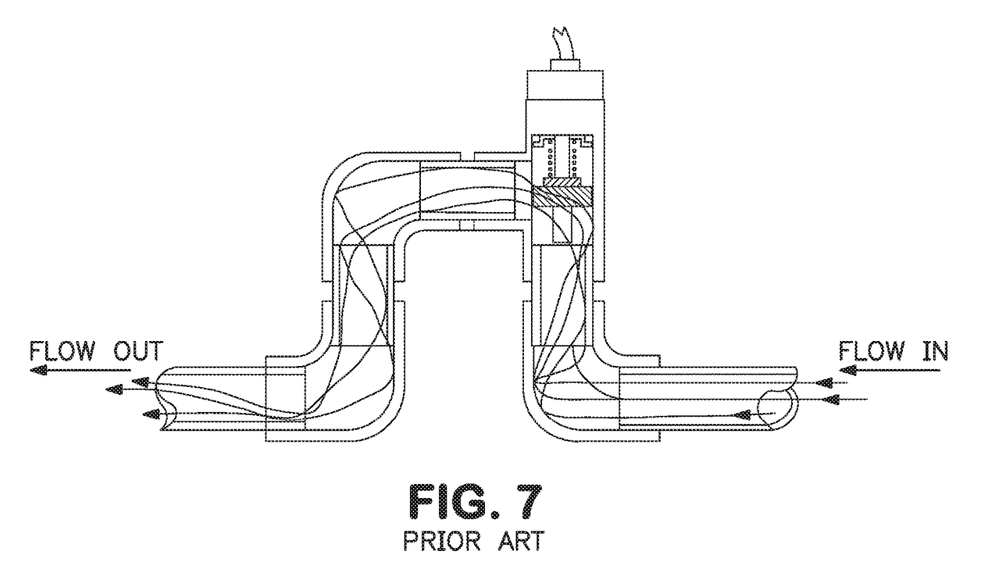
FIG. 7 is an annotated sectional view, portions removed and portions shown in schematic, illustrating a turbulent flow which results from a prior art flow sensor module.

In a conventional flow, such as illustrated in the prior art systems of FIGS. 6 and 7, there is a choppiness to the flow as the liquid or "air bang" into the right or left turn resulting in switch chatter resulting from the flow mix with pressure areas and laminar areas. Thus, the eddies, choppiness and chatter is significantly reduced, if not eliminated by the flow sensor module 10, and the shuttle 70 thus is forced to jump up and down in closing the switch in a very efficient and deliberate fashion. Any chatter is essentially at a low or non-existent level, maintaining a true stable switch state.

By contrast with the flow sensor module 10 of FIGS. 1, 2 and 4, FIG. 6 illustrates a prior art conventional flow system, and the flow sensor is essentially disposed perpendicular to the flow path. The flow path shows schematically a rather turbulent flow which bounces off of the various walls. For example, the fluid flow makes as many as six 90° turns, even when the inflow essentially laminar.

The prior art fluid flow system of FIG. 7 illustrates another representative industry standard flow system which can be compared to the favorable laminar flow characteristics and a stable shuttle state of flow sensor module 10 of FIG. 1. The flow has been diagrammatically depicted to illustrate the turbulence in various portions of the conduits which lead to the fluid sensor as well as exit from the flow sensor. It will be appreciated that the sensor would be less accurate under higher pressure areas and faster speeds in different regions of the flow. The so-called camel-hump piping configuration is also more vulnerable to damage due to water "hammer".

It will also be appreciated that it is extremely difficult (and a common water treatment problem) to clean the areas due to manganese and iron buildup. The pressure differential between the input port and the output port is extremely high in the illustrated FIG. 7 prior art flow configuration. The space constraints essentially preclude enlarging the piping diameter to make a more laminar fluid flow and thus a more reliable flow sensor.

Figure 8:
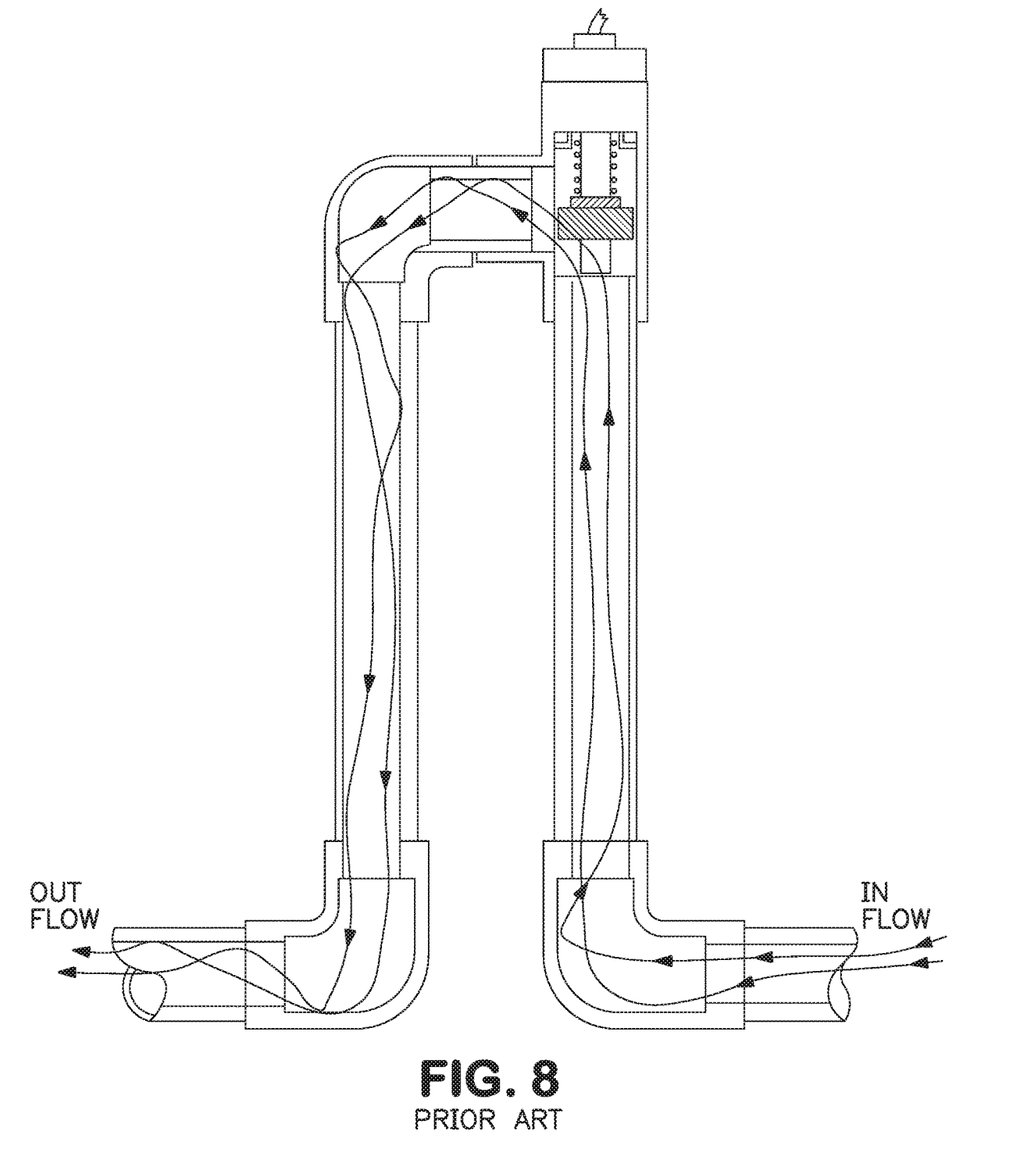
FIG. 8 is an annotated side elevational view, portions shown in schematic, of a prior art flow sensor module as incorporated into a flow system having improved less turbulent flow but significant headroom constraints.

The FIG. 8 prior art system illustrates additional significant space constraints for prior flow sensor installations—even for less turbulent fluid flow.

In summary, it should be appreciated that the disclosed flow sensor module 10 is accomplished by a flow sensor which does not suffer from the deficiencies of a pressure switch which can close contacts, thereby energizing various operations even when no flow of liquid is present. In previous systems which employ a pressure switch to turn on the various devices, such devices can inject chemicals, drain pressure, etc., when there is actually no flowing fluid.

In addition, the solid state controller 80 makes the system understandable to the operator of the system. The operator can override or bypass the flow sensor by simply pressing a manual switch, to purge out air to force the flow, liquid or gas, into the metered output. While the controller 80 is operating, the operator can watch the various control indicators and verify that the system is truly properly operating. The system can be tested electrically to verify via the indicators and visually that there is a flow to correctly ascertain whether there is a flow or lack of flow in the system. In this sense, the flow sensor module 10 truly employs a flow sensor to create a true liquid or gas flow and not just a sensed pressure so that, for example in a system, a chemical injected by a feed pump that may be caustic would not be injected into a flow stream which does not have a fluid flow.

In one embodiment, the controller 80 is water resistant. The solid state components, the switch and other components are potted in a receptacle which is impervious to water. A water resistant disconnect in the form of a weather pack is implemented into the cable connecting the pump control to the flow sensor. If either part requires replacement, the customer could disconnect the part and reconnect the new one. Consequently, the pump control could be employed with any type of flow sensor or level sensor and any other type of sensor which could be connected with the controller.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A flow system comprising:
   first and second aligned linear conduit portions defining a linear flow path;
   a fitting having first and second ends and interposed in said linear flow path between said first and second conduit portions and having a cylindrical input portion and a spaced cylindrical outlet portion and defining an intermediate portion of said linear flow path between said first and second conduit portions and defining a sensor bypass disposed at an acute angle to said linear flow path and defining a first port in said cylindrical input portion and defining a second port in said cylindrical output portion wherein said first and second ports are located between said ends;
   a dynamic pressure or flow sensor disposed in said sensor bypass; and
   a bonnet assembly removably mounted to said fitting and mounting said sensor and fluidly sealing said sensor in said fitting.

2. The system of claim 1 further comprising an inlet conduit having a valve for selectively introducing fluid into said flow path, said valve being responsive to a signal generated by said sensor.

3. The system of claim 1 wherein said sensor is selected from the group consisting of a reed switch, a Hall switch, a bi-metallic switch and a change of logic switch.

4. The system of claim 1 further comprising an annular opening disposed at said bypass upstream from said sensor.

5. The system of claim 1 further comprising a solid state controller having a panel which indicates whether there is fluid flow through the flow system.

6. The system of claim 5 further comprising a manual override switch to turn on a device selected from the group consisting of a feed pump, a control valve, an air trap device and an electrically operated device.

7. The system of claim 5 wherein the panel further comprises a chemical feed pump default indicator, a control valve indicator or an air trap device indicator.

8. The system of claim 1 wherein said bonnet assembly comprises a central shaft and said fitting defines a blind hole wherein said shaft is received in said blind hole.

9. The system of claim 1 wherein at least one gauge communicates with said first and second port.

10. A sensor module for a linear flow path comprising:
    a fitting comprising longitudinally spaced cylindrical receivers configured to receive first and second conduit portions so as to define a linear flow path between and through said first and second conduit portions and comprising an offset extension defining a sensor bypass disposed at an acute angle to said linear flow path defining a blind hole opposite said extension;
    a dynamic pressure or flow sensor disposed in said sensor bypass and having a shaft with a distal end received in said blind hole; and
    an assembly mounted to said offset extension and mounting said sensor and fluidly sealing said sensor in said offset extension.

11. The sensor module of claim 10 and further comprising an inlet conduit having a valve for selectively introducing fluid into said flow path, said valve being responsive to a signal generated by said sensor.

12. The sensor module of claim 10 wherein said fitting has an internal spherical type radius.

13. The sensor module of claim 10 further comprising a first port defined in a first fitting portion and a second port disposed in a second fitting portion.

14. The sensor module of claim 10 wherein said sensor is selected from the group consisting of a reed switch, a Hall switch, a bi-metallic switch and a change of logic switch.

15. The sensor module of claim 10 further comprising an annular opening is disposed at said bypass upstream from said sensor.

16. The sensor module of claim 10 further comprising a solid state controller comprising a panel which indicates whether there is fluid flow through the linear flow path.

17. The sensor module of claim 10 wherein the assembly is a bonnet assembly removably mounted to the fitting.

18. The sensor module of claim 15 and further comprising a receptacle for said controller which is responsive to said sensor.

19. The sensor module of claim 1 wherein said fitting has an internal spherical-type radius.

\* \* \* \* \*